United States Patent
Han

(10) Patent No.: US 12,024,157 B2
(45) Date of Patent: Jul. 2, 2024

(54) HYBRID ELECTRIC VEHICLE AND METHOD OF POWERTRAIN CONTROL FOR THE SAME

(71) Applicants: Kia Corporation, Seoul (KR); Hyundai Motor Company, Seoul (KR)

(72) Inventor: Jung Suk Han, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/498,835

(22) Filed: Oct. 31, 2023

(65) Prior Publication Data

US 2024/0092341 A1    Mar. 21, 2024

Related U.S. Application Data

(63) Continuation of application No. 17/743,053, filed on May 12, 2022, now Pat. No. 11,840,214.

(30) Foreign Application Priority Data

Dec. 2, 2021  (KR) .................. 10-2021-0170616

(51) Int. Cl.
  *B60W 20/16*    (2016.01)
  *G06V 20/58*    (2022.01)
(52) U.S. Cl.
  CPC ........... *B60W 20/16* (2016.01); *G06V 20/582* (2022.01); *B60W 2420/403* (2013.01); *B60W 2552/05* (2020.02); *B60W 2555/60* (2020.02)

(58) Field of Classification Search
  CPC .......... B60W 20/16; B60W 2420/403; B60W 2552/05; B60W 2555/60; B60W 2556/50; B60W 20/20; B60W 20/00; B60W 20/40; B60W 40/02; B60W 2552/00; B60W 30/182; G06V 20/582; G06V 20/588; B60Y 2200/92; Y02T 10/62
  See application file for complete search history.

(56) References Cited

U.S. PATENT DOCUMENTS

2020/0240306 A1*  7/2020  Osemann .............. F01N 3/2026

* cited by examiner

*Primary Examiner* — Xiao En Mo
(74) *Attorney, Agent, or Firm* — MORGAN, LEWIS & BOCKIUS LLP

(57) ABSTRACT

A hybrid electric vehicle or a powertrain control method therefor controlling a powertrain with a more effective recognition of an entry into a low emission zone may include steps of: determining by use of image-based road-sign recognition information an entry into a zone in which an amount of exhaust gas is requested to be reduced; determining an average size for a type of the zone in case where the entry thereinto is determined by the control unit; and controlling a driving mode to be Electric Vehicle (EV) mode until it is determined based on the average size that the vehicle exists the zone.

20 Claims, 2 Drawing Sheets

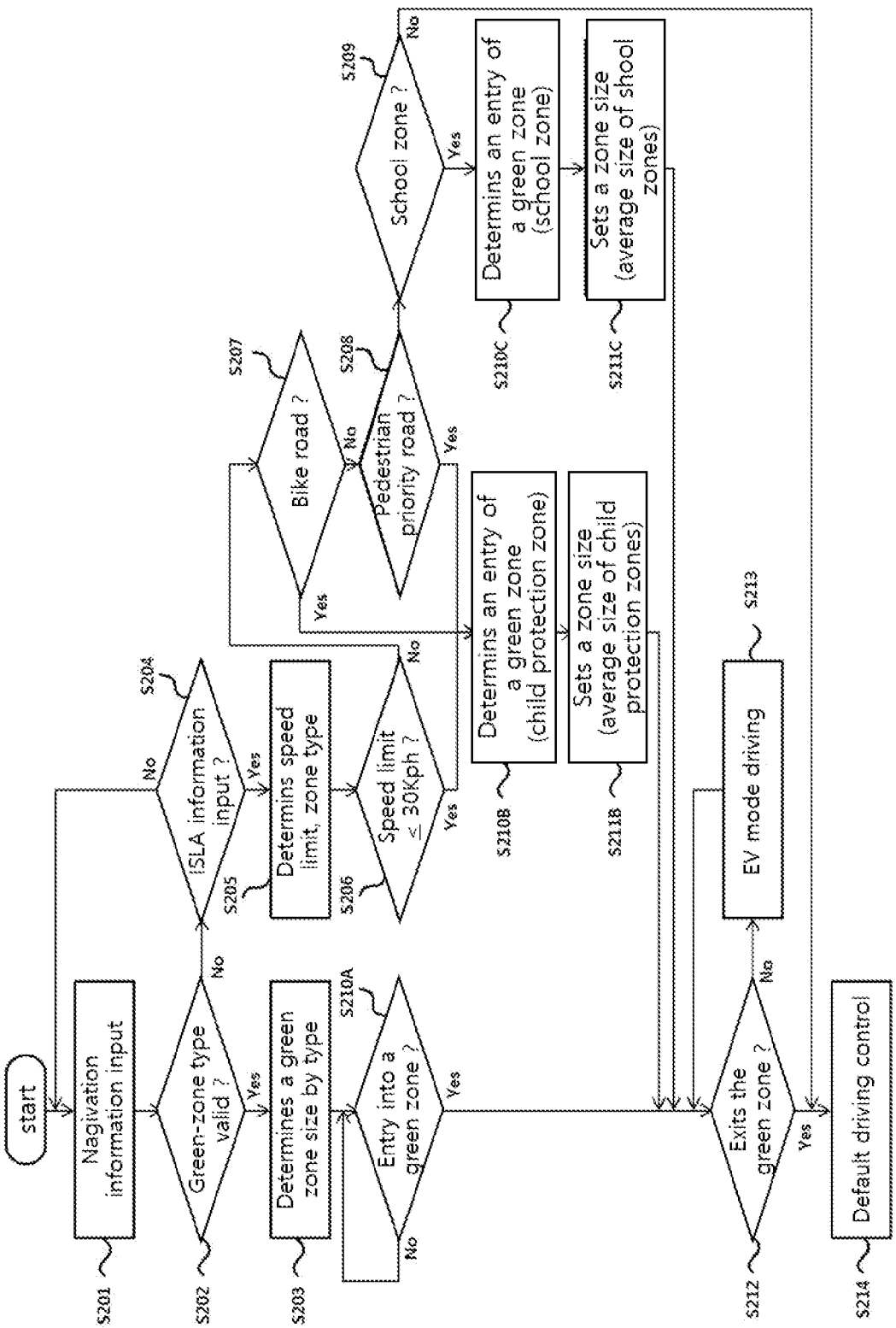

HYBRID ELECTRIC VEHICLE AND METHOD OF POWERTRAIN CONTROL FOR THE SAME

CROSS-REFERENCE TO RELATED APPLICATION

The present application is a continuation application of the U.S. patent application Ser. No. 17/743,053 and claims priority to Korean Patent Application No. 10-2021-0170616, filed on Dec. 2, 2021, the entire contents of which is incorporated herein for all purposes by this reference.

BACKGROUND OF THE PRESENT DISCLOSURE

Field of the Present Disclosure

The present disclosure relates to a hybrid electric vehicle or a powertrain control method thereof for controlling a powertrain with a more effective recognition of an entry into a low emission zone.

Description of Related Art

In recent, as interest in environment grows, there is an increasing trend towards eco-friendly vehicles in which an electric motor is used for their driving. One of eco-friendly vehicles is an electrified vehicle of which a typical example is a hybrid electric vehicle. Here, the term "electrified vehicle" refers to a range of technologies that use electricity to propel a vehicle.

In a hybrid electric vehicle, an electric motor or an engine is selectively used in accordance to a driving situation, and thus an amount of exhaust gas can be reduced and a gas mileage increased. Also, the engine can be selectively kept from being used in a zone where more improved air quality is required for pedestrians. Such zone is, for example, a school (primary/middle/high school or college) area, a hospital area, a park, a residential area, etc. and it can be referred to as a "green zone."

In a hybrid electric vehicle, it can be determined whether the driving path passes through a green zone, and if so, the driving mode can be changed to an EV mode (Electric Vehicle mode) prior to entering thereinto and furthermore the battery may be charged, in advance, to pass through the zone.

In a conventional hybrid electric vehicle, because the path information is only obtained from a navigation system to use for the recognition of the green zone, in case where the path is changed or not supplied from the navigation system, the green zone may be missed to be recognized before being entered and/or the vehicle may not be prepared for driving in the zone. Because the navigation system lacks information on child protection areas, the green zone driving for the child protection area may be missed, which is worsened with a low-definition or outdated map.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a hybrid electric vehicle or a powertrain control method thereof for controlling a powertrain with more effective recognition of a green zone.

Additional advantages, objects, and features of the present disclosure will be set forth in part in the description which follows and in part will become apparent to those having ordinary skill in the art upon examination of the following or may be learned from practice of the present disclosure. The objectives and other advantages of the present disclosure may be realized and attained by the structure particularly pointed out in the written description and claims hereof as well as the appended drawings.

One embodied method for controlling of driving of a hybrid electric vehicle may comprise determining, by a control unit, an entry into a preset zone which is preset in a navigation system of the vehicle, and controlling, by the control unit, a driving mode of the vehicle to be an Electric Vehicle (EV) mode in the zone.

In at least one embodiment of the present disclosure, the method further comprises determining that the preset zone is ahead on a driving path based on information output from the navigation system.

In at least one embodiment of the present disclosure, the information includes at least one of a location, a boundary, or a type of the preset zone.

In at least one embodiment of the present disclosure, the type includes an area designated by a driver, a child protection zone, a school zone, a hospital zone, a residential area, a shopping mall zone, or a park zone.

In at least one embodiment of the present disclosure, the method further comprise determining a remaining distance to the present zone.

In at least one embodiment of the present disclosure, determining the entry into the preset zone comprises determining the entry based on a vehicle speed and the remaining distance.

In at least one embodiment of the present disclosure, the method further comprise charging a battery of the vehicle based on an SOC thereof before the entry, the battery supplying electrical power to a motor which drives the vehicle.

In at least one embodiment of the present disclosure, the method further comprise determining a size of the preset zone based on information output from the navigation system.

In at least one embodiment of the present disclosure, the method further comprise updating an average size, stored in a non-transitory memory, of a type of the preset zone with the size of the preset zone.

In at least one embodiment of the present disclosure, the method further comprise determining that the vehicle exits the preset zone based on a vehicle speed and the size of the preset zone.

In at least one embodiment of the present disclosure, the method further comprise adjusting an EV line and maintaining it at an upper position until the vehicle exits the preset zone.

In at least one embodiment of the present disclosure, the method further comprise determining a change of the driving mode from the EV mode to an HEV mode in response to an SOC of a battery of the vehicle reaching a predefined limit before the vehicle exits the preset zone.

On the other hand, an exemplary embodiment of a hybrid electric vehicle according the present disclosure may comprise a navigation system, and a control unit configured to determine an entry into a preset zone which is preset in the navigation system, and control a driving mode of the vehicle to be an Electric Vehicle (EV) mode in the zone.

In at least one embodied vehicle of the present disclosure, the control unit is further configured to determine that the preset zone is ahead on a driving path based on information output from the navigation system.

In at least one embodied vehicle of the present disclosure, the information includes at least one of a location, a boundary, or a type of the preset zone.

In at least one embodied vehicle of the present disclosure, the type includes an area designated by a driver, a child protection zone, a school zone, a hospital zone, a residential area, a shopping mall zone, or a park zone.

In at least one embodied vehicle of the present disclosure, the control unit is further configured to determine a remaining distance to the present zone.

In at least one embodied vehicle of the present disclosure, the control unit is further configured to determine the entry based on a vehicle speed and the remaining distance.

In at least one embodied vehicle of the present disclosure, the control unit is further configured to charge a battery of the vehicle based on an SOC thereof before the entry, the battery supplying electrical power to a motor which drives the vehicle.

In at least one embodied vehicle of the present disclosure, the control unit is further configured to determine a size of the preset zone based on information output from the navigation system, and update an average size, stored in a non-transitory memory, of a type of the preset zone with the size of the preset zone.

According to the various above-described embodiments of the present disclosure, because green zones are recognized with various methods, the accuracy of driving control in green zones may be enhanced.

Technical effect of the present disclosure is not limited to the above-mentioned effect, and a skilled person in the Field of the Invention the present disclosure may well understand other effects of the present disclosure from below description.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

The FIG. 1 shows an exemplary components of an exemplary embodiment of a hybrid electric vehicle in accordance with various aspects of the present disclosure.

The FIG. 2 represents a flowchart of an exemplary driving control process of an embodied hybrid electric vehicle of the present disclosure with a green zone taken into consideration.

Figure 1:
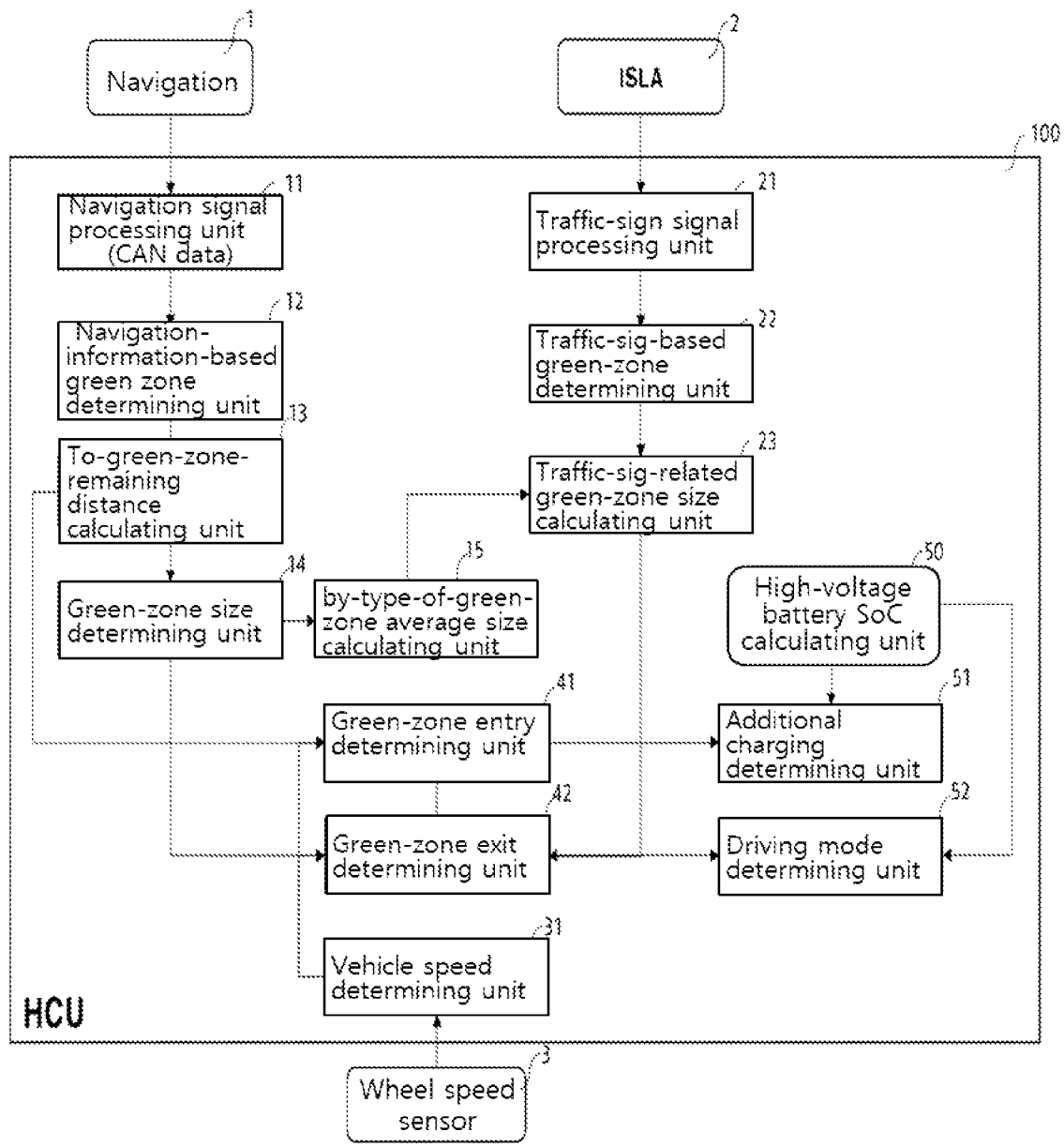

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Furthermore, in describing the exemplary embodiments included in the exemplary embodiment when it is determined that a detailed description of related publicly known technology may obscure the gist of the exemplary embodiments included in the exemplary embodiment, the detailed description thereof will be omitted. The accompanying drawings are used to help easily explain various technical features and it should be understood that the exemplary embodiments presented herein are not limited by the accompanying drawings. Accordingly, the present disclosure should be construed to extend to any alterations, equivalents and substitutes in addition to those which are particularly set out in the accompanying drawings.

Although terms including ordinal numbers, such as "first", "second", etc., may be used herein only to differentiate various elements, the elements are not construed to be limited by these terms. These terms are generally only used to distinguish one element from another.

When an element is referred to as being "coupled" or "connected" to another element, the element may be directly coupled or connected to the other element. However, it should be understood that another element may be present therebetween. In contrast, when an element is referred to as being "directly coupled" or "directly connected" to another element, it should be understood that there are no other elements therebetween.

A singular expression includes the plural expression unless the context clearly dictates otherwise.

In the exemplary embodiment, it should be understood that a term such as "include" or "have" is intended to designate that the features, numbers, steps, operations, elements, parts, or combinations thereof described in the specification are present, and does not preclude the possibility of addition or presence of one or more other features, numbers, steps, operations, elements, parts, or combinations thereof.

Furthermore, the term "unit" or "control unit," as like included in a hybrid control unit, is only a widely used term for a name of a controller configured for controlling a specific function of a vehicle, and does not mean a generic function unit. For example, each unit or control unit may include a communication device configured to communicate with another control device or sensor to control a function assigned thereto, a memory configured to store an operating system or logic command input/output information, and one or more processors configured to perform determination, calculation, decision, etc. necessary for controlling the function assigned thereto.

According to various exemplary embodiments of the present disclosure, it is suggested that a green zone is recognized not by only navigation information but also by an image-based surroundings recognition device.

The FIG. 1 shows an exemplary components of an exemplary embodiment of a hybrid electric vehicle in accordance with various aspects of the present disclosure.

In reference to the FIG. 1, the embodied hybrid electric vehicle may include a navigation 1, an intelligent speed limit assist (ISLA) 2, a wheel-speed sensor 3 and a hybrid control unit (HCU) 100. The FIG. 1 only shows part of the exemplary embodiment of the present disclosure, and it is obvious that the vehicle may further include other components.

The components may be connected to each other in communication through an in-vehicle network. As the in-vehicle network, Controller Area Network (CAN), CAN-FD (flexible data-rate), Ethernet, etc. may be applied, but the present disclosure is not limited to the mentioned networks. For the sake of explanation in the present description, the components are treated as being hypothetically connected to each other through a CAN.

The navigation 1 may be referred to as a navigation system or Audio, Video, and Navigation (AVN), and typically it functions to guide a path based on a current location and map information. In the exemplary embodiment of the present disclosure, the navigation 1 can provide with information on various driving environment especially including green zones. The information on a green zone may include its location, boundary, type, etc., and the information is not necessarily limited to those.

The ISLA 2 is configured to output a warning or limit a current speed so as not to make a vehicle speed go beyond the speed limit regulated on a current driving road, after determining the limit based on a surrounding image(s) obtained through a camera (not shown in the Figs.). In the exemplary embodiment of the present disclosure, the ILSA 2 can provide the HCU 100 with recognized information after detecting a road sign from a camera image and recognizing its type, speed limit, etc. The exemplary embodiment includes the ISLA 2 only because it includes basically a function of recognition for road signs. Therefore, it is obvious to the skilled person in the art that other image-based recognition device can replace the ILSA 2 provided that the device can recognize road signs based on image information.

The wheel speed sensor 3 can detect a rotation speed of a wheel and provide the HCU 100 with the detected speed information.

Typically, the HCU 100 is configured as a higher hierarchy controller for a lower hierarchy controller (ex., an engine controller, a motor controller, a transmission controller, etc.) controlling a hybrid powertrain (ex., an engine, an electric motor, a transmission, etc.).

For example, the HCU 100 determines a switch between EV and HEV modes or CD and CS modes according to a driving state of the vehicle. To the present end, the HCU 100 can control the lower hierarchy controllers to judge a mode change condition and perform the mode change. In the exemplary embodiment of the present disclosure, the HCU 100 can conduct a green-zone-related control based on information from the navigation 1 and the ISLA 2.

In more detail, an exemplary embodiment of the HCU 100 may include a navigation signal processing unit 11, a navigation-information-based green-zone determining unit 12, a to-green-zone-remaining distance determining unit 13, a green-zone size determining unit 14, a by-type-of-green-zone average size determining unit 15, a traffic-sign signal processing unit 21, a traffic-sign-based green-zone determining unit 22, a traffic-sign-related green-zone size determining unit 23, a vehicle speed determining unit 31, a green-zone entry determining unit 41, a green-zone exit determining unit 42, a high-voltage battery State of Charge (SOC) determining unit 50, an additional charging determining unit 51, and a driving mode determining unit 52.

The navigation signal processing unit 11 receives a CAN frame output from the navigation 1 and obtains data in the CAN frame, and the navigation-information-based green-zone determining unit 12 can parse green-zone-related information among the obtained data.

For instance, among the green-zone-related information, green-zone type information may have the data types as shown in the table 1 below.

TABLE 1

| Signal Name | Value |
| --- | --- |
| Green Zone Type | 0x0: Residential Area (designated by a driver)<br>0x1: Child Protection Zone<br>0x2: School (Primary/Middle/High)<br>0x3: Hospital<br>0x4: Residential Area (Apartment)<br>0x5: Large Shopping Mall<br>0x6: Park |

The to-green-zone-remaining distance determining unit 13 can determine a remaining distance to a green zone ahead on the path based on the parsed information, and the green-zone size determining unit 14 can determine the size of the green zone based on green zone area information of the parsed information. The by-type-of-green-zone average size determining unit 15 may match the green zone size determined by the green-zone size determining unit 14 to a type of the green zone, and determine the average size of green zones for the type. To determine the average size of green zones for each green zone type, the green-zone size determining unit 14 can determine and update the average size whenever size information of a green zone is obtained for the type. For instance, the by-type-of-green-zone average size determining unit 15 may recognize the type of a green zone as school zone, and determine and update the average size of school zones based on the size of the corresponding recognized green zone. The updated average size information is desirable to be stored in a non-volatile memory (ex, NVRAM).

On the other hand, the traffic-sign signal processing unit 21 can receive a CAN frame output from the ISLA 2 and obtain data included in the CAN frame, and the traffic-sign-information-based green-zone determining unit 22 can parse, among the obtained data, information on a speed limit and a type of a traffic sign, and determine, based on the parsed information, whether or not a current location to be in a green zone and a type thereof.

TABLE 2

| Signal Name | Value |
| --- | --- |
| School | 0x0: No School Zone<br>0x1: School Zone |
| Road-sign Further Information | 0x0: No Recognition (default)<br>0x1: School Crossing<br>0x2: Pedestrian Crossing<br>0x3: Bicycle Crossing<br>0x8: Stop<br>0x9: Yield<br>0xA: Stop Ahead<br>0xB: Yield Ahead<br>0xC: Road Construction Ahead<br>0xD: Lane Reduction<br>0x10: Do Not Pass<br>0x18: Exit |

TABLE 2-continued

| Signal Name | Value |
| --- | --- |
|  | 0x19: Roundabout |
|  | 0x1A: Right Curve |
|  | 0x1B: Left Curve |
|  | 0x1C: Winding Road |

The table 2 above represents examples of the data types of traffic sign information. In the table 2, in case where a school signal is set as 0x1 (school zone), or a traffic-sign additional information signal is set as 0x1 (child protection zone), 0x2 (pedestrian priority zone), or 0x3 (bike road), the traffic-sign signal processing unit 21 may determine that the vehicle entered and is in a green zone.

Even though information regarding the pedestrian priority zone and the bike road is not provided by the navigation 1, they are in the purpose of the green zone policy because there are a lot of pedestrians or bike-riders in the areas. In the end, by use of the ISLA information, a disadvantage of a navigation-based green-zone recognition which is dependent on an update of a map data, or a discrepancy of the recognition success rate dependent on a map accuracy may be mitigated.

TABLE 3

| ISLA state | | CAN Information Value |
| --- | --- | --- |
| Speed Limit of Conditional Road-sign | None | 0x00 |
|  | Yes | 0x01~0xFC |

The table 3 above represents examples of data types of speed limit information of traffic signs. The ISLA 2 outputs 0 as a CAN information value in case of there not being speed limit information, and in case of a speed limit being recognized, 01 or FC according to the speed limit. Therefore, in the table 3, if the CAN information value is equal to or smaller than a predetermined speed (for example, 30 Kph), the traffic-sign signal processing unit 21 may determine that the vehicle entered and is in a green zone.

However, with only traffic sign information, the size of a green zone cannot be determined. In other words, with ISLA information, it may be determined whether or not a current location is in a green zone (namely, it entered into a green zone), but it is difficult to make a determination of an exit of a green zone because the boundary of the green zone is not known. Therefore, the traffic-sign-related green-zone size determining unit 23 may determines as a current green-zone size an average green-zone size, among average green-zone sizes of respective types, corresponding to the type to which traffic sign information is matched.

Next, the vehicle speed determining unit 31 determines a vehicle speed based on wheel speed information transmitted from a wheel speed sensor 31, the green-zone entry determining unit 41 may determine whether or not a green zone being entered based on the vehicle speed and a remaining distance to the green zone, and the green-zone exit determining unit 42 may determine whether or not the green zone being exited based on the size of the green zone and the vehicle speed.

In case where the green-zone entry determining unit 41 determines that the vehicle has not entered into a green zone, the additional charging determining unit 51 may determine whether to charge a high-voltage battery until before the entry according to a determination of the high-voltage battery SoC determining unit 50 which determines an SOC value of the high-voltage battery connected electrically to a driving motor.

The driving mode determining unit 52 may keep a driving mode in EV mode until before the green-zone exit determining unit 42 makes a determination of the green zone being exited. To keep the EV mode more actively, the driving mode determining unit 52 may set an EV line upward, which is a threshold for shifting to a HEV mode which is set for a torque requested by a driver. However, the driving mode determining unit 52 may determine to shift to the HEV mode in case where an SOC value of the high-voltage battery determined from the high-voltage battery SoC determining unit 50 goes below a predefined lower limit.

The driving control process described above may be organized as a flowchart in the FIG. 2.

The FIG. 2 represents a flowchart of an exemplary driving control process of an embodied hybrid electric vehicle of the present disclosure with a green zone taken into consideration.

In reference to the FIG. 2, it may be determined whether a green zone type in a path ahead is valid or not in the HCU 100 according to information input from the navigation 1 (S201). In case of the type being valid (Yes in S202), the HCU 100 determines the size of the corresponding green zone, and determines, updates and stores a green zone size of the type (S203). As described above, this is, when using ISLA 2 information, for determining a green zone size according to the type thereof. Next, the HCU 100 determines an entry in the green zone based on a vehicle speed and a remaining distance to the green zone (S210A), and in a case of determining that the vehicle did not enter yet, may control a charge to the high-voltage battery (for example, a charge of 3-5%) according to its SoC until the entry.

If there is no information on a valid-typed green zone (No in S202), the HCU 100 may obtain information input from the ISLA 2 (Yes in S204), and determine a type of a traffic sign and a speed limit according to the sign (S205).

If the speed limit is equal to or below a predefined value (ex, 30 Kph) (Yes in S206), or the type of the sign is for a bike road (Yes in S207) or a pedestrian priority zone (Yes in S208), the HCU 100 may determine that the vehicle entered in a green zone of which a type is a child protection zone (S210B). Accordingly, the HCU 100 may determine an average green zone size for child protection zones among pre-stored average sizes by green-zone type as a current green-zone size (S211B).

Otherwise, if the type of the sign is for a school zone (Yes in S209), the HCU 100 may determine that it entered in a green zone of which a type is a school zone (S210C). Accordingly, the HCU 100 may determines an average green zone size for school zones among pre-stored average sizes by green-zone type as a current green-zone size (S211C).

Once an entry in a green zone determined (Yes in S210A, or S210B or S210C), the HCU 100 may determine whether to have exited the green zone based on a determined green zone size (S203, S211B or S211C) and a vehicle speed (S212). In case of having not exited yet (No in S212), the HCU 100 may keep the EV mode driving within a capability of the SOC value of the high-voltage battery (S213).

If determined to have exited the green zone (No in S212), the HCU 100 may conduct a default driving control according to predetermined conditions such as an SOC value of the high-voltage battery and a requested torque (S214). In case where information on a type of a green zone is not valid in information of navigation 1 (No in S202), nor is the information on a traffic sign obtained from the information of ISLA 2 (No in S209), the default driving control may be conducted (S214).

In conventional hybrid electric vehicles, because determination of entry into a green zone is made only with navigation information, the entry is not recognized even in the zone in case of the vehicle being provided with a low-definition or outdated map, and driving control for a green zone is impossible with a vehicle having no navigation system. However, according to the exemplary embodiment described above, green zone driving control is possible with high accuracy because a green zone is detected or recognized with not only a navigation system but also road sign information input from a camera in a vehicle (for example, an ISLA-provided vehicle) where camera information is available.

On the other hand, the present disclosure described above may be embodied as a program code stored in a computer-readable storage medium. The computer-readable storage medium includes all types of recordable medium in which computer-readable data may be stored. Examples of the computer-readable medium are a Hard Disk Drive (HDD), a Solid State Disk (SSD), a Silicon Disk Drive (SDD), a ROM, a RAM, a CD-ROM, a magnetic tape, a floppy disk, a light data storage device, etc. Accordingly, the above description, in all respects, may not be construed as limited thereto, but considered as one example. The scope covered as an exemplary embodiment of the present disclosure is decided by reasonable interpretation of the attached claims, and all equivalent variants of the present disclosure are encompassed in the scope of the present disclosure.

In various exemplary embodiments of the present disclosure, the control device may be implemented in a form of hardware or software, or may be implemented in a combination of hardware and software.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method for controlling of driving of a vehicle, the method comprising:
   determining, by a control unit, an entry into a preset zone which is preset in a navigation system of the vehicle; and
   controlling, by the control unit, a driving mode of the vehicle to be an Electric Vehicle (EV) mode in the zone.

2. The method of the claim 1, further comprising determining that the preset zone is ahead on a driving path based on information output from the navigation system.

3. The method of the claim 2, wherein the information includes at least one of a location, a boundary, or a type of the preset zone.

4. The method of the claim 3, wherein the type includes an area designated by a driver, a child protection zone, a school zone, a hospital zone, a residential area, a shopping mall zone, or a park zone.

5. The method of the claim 2, further comprising determining a remaining distance to the present zone.

6. The method of the claim 5, wherein determining the entry into the preset zone comprises determining the entry based on a vehicle speed and the remaining distance.

7. The method of the claim 5, further comprising charging a battery of the vehicle based on an SOC thereof before the entry, the battery supplying electrical power to a motor which drives the vehicle.

8. The method of the claim 1, further comprising determining a size of the preset zone based on information output from the navigation system.

9. The method of the claim 8, further comprising updating an average size, stored in a non-transitory memory, of a type of the preset zone with the size of the preset zone.

10. The method of the claim 8, further comprising determining that the vehicle exits the preset zone based on a vehicle speed and the size of the preset zone.

11. The method of the claim 1, further comprising adjusting an EV line and maintaining it at an upper position until the vehicle exits the preset zone.

12. The method of the claim 11, further comprising determining a change of the driving mode from the EV mode to an HEV mode in response to an SOC of a battery of the vehicle reaching a predefined limit before the vehicle exits the preset zone.

13. A vehicle comprising:
    a navigation system; and
    a control unit configured to determine an entry into a preset zone which is preset in the navigation system, and control a driving mode of the vehicle to be an Electric Vehicle (EV) mode in the zone.

14. The vehicle of claim 13, wherein the control unit is further configured to determine that the preset zone is ahead on a driving path based on information output from the navigation system.

15. The vehicle of claim 14, wherein the information includes at least one of a location, a boundary, or a type of the preset zone.

16. The vehicle of claim 15, wherein the type includes an area designated by a driver, a child protection zone, a school zone, a hospital zone, a residential area, a shopping mall zone, or a park zone.

17. The vehicle of claim 14, wherein the control unit is further configured to determine a remaining distance to the present zone.

18. The vehicle of claim 17, wherein the control unit is further configured to determine the entry based on a vehicle speed and the remaining distance.

19. The vehicle of claim 17, wherein the control unit is further configured to charge a battery of the vehicle based on an SOC thereof before the entry, the battery supplying electrical power to a motor which drives the vehicle.

20. The vehicle of claim 13, wherein the control unit is further configured to determine a size of the preset zone based on information output from the navigation system, and update an average size, stored in a non-transitory memory, of a type of the preset zone with the size of the preset zone.

* * * * *